US010056206B2

(12) United States Patent
Chen

(10) Patent No.: US 10,056,206 B2
(45) Date of Patent: Aug. 21, 2018

(54) BACKLIT KEYBOARD USING TWO THIN-FILM CIRCUIT BOARDS

(71) Applicants: LITE-ON ELECTRONICS (GUANGZHOU) LIMITED, Guangzhou (CN); LITE-ON TECHNOLOGY CORPORATION, Taipei (TW)

(72) Inventor: Chun-Lin Chen, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/471,357

(22) Filed: Mar. 28, 2017

(65) Prior Publication Data

US 2018/0075989 A1 Mar. 15, 2018

(30) Foreign Application Priority Data

Sep. 13, 2016 (CN) .......................... 2016 1 0822245

(51) Int. Cl.
*H01H 13/83* (2006.01)
*H01H 13/702* (2006.01)
*G06F 3/041* (2006.01)

(52) U.S. Cl.
CPC .......... *H01H 13/83* (2013.01); *H01H 13/702* (2013.01); *G06F 3/0414* (2013.01); *H01H 2219/036* (2013.01)

(58) Field of Classification Search
CPC .......... H05K 1/03; H05K 1/0393; H05K 1/09; H05K 1/18; H01H 13/83; H01H 13/702–2219/306; H01H 13/04
USPC .................................................. 200/310, 313
See application file for complete search history.

(56) References Cited

U.S. PATENT DOCUMENTS

| | | | | |
|---|---|---|---|---|
| 6,743,993 | B1 * | 6/2004 | Clark | H01H 13/702 200/314 |
| 7,151,528 | B2 * | 12/2006 | Taylor | G06F 3/0414 345/168 |
| 8,581,125 | B2 * | 11/2013 | Chen | H01H 13/83 200/5 A |
| 2003/0025679 | A1 † | 2/2003 | Taylor | |
| 2010/0066568 | A1 † | 3/2010 | Lee | |
| 2014/0160722 | A1 † | 6/2014 | Ho | |

FOREIGN PATENT DOCUMENTS

CN 204498459 U 7/2015

* cited by examiner
† cited by third party

*Primary Examiner* — Vanessa Girardi
(74) *Attorney, Agent, or Firm* — Li & Cai Intellectual Property (USA) Office

(57) ABSTRACT

A direct-backlit keyboard is disclosed, the direct-backlit keyboard comprising a plurality of keys, a thin film circuit board, a base plate, a copper etched thin-film circuit board, and a plurality of light-emitting units. The plurality of keys are disposed on the thin film circuit board, the thin film circuit board being disposed on the base plate, the base plate being disposed on the copper etched thin-film circuit board, and the copper etched thin film circuit board being provided with the plurality of light-emitting units. Each light-emitting unit corresponds to each key so that the light emitted from each light-emitting unit can be transmitted to each corresponding key.

12 Claims, 6 Drawing Sheets

BACKLIT KEYBOARD USING TWO THIN-FILM CIRCUIT BOARDS

BACKGROUND OF THE INVENTION

1. Field of the Invention

The instant disclosure relates to an illuminated keyboard; in particular, to a thinned, low-cost, and of high luminous efficacy direct-backlit keyboard.

2. Description of Related Art

Illuminated keywords can be categorized into two types, direct-backlit keyboard and edge-lit keyboard, in which direct-backlit keyboards are featured by high luminous efficacy and having fewer components than other kinds of keyboard. A direct-backlit keyboard with publication number No. 468833 was disclosed around sixteen years ago. The techniques then available provide backlight by disposing LEDs on PCBAs (Printed Circuit Board Assemblies) or FPCs (Flexible Printed Circuits). However, utilizing PCBAs increases the thickness of direct-backlit keyboards, and utilizing FPCs increases the cost thereof. Therefore, the prior art technique failed to provide slim-type direct-backlit keyboards at reasonable prices.

As circuit board technology advances, a flexible circuit is disclosed (Patent Number: CN 204498459), in which copper-plated wires with small width are used to replace printed silver wires in the prior industry. Accordingly, the applicant had made efforts to overcome the shortcomings of prior art direct-backlit keywords along with the improvement of circuit board technology, and herein provides an invention which solves the aforementioned drawbacks in prior art direct-backlit keyboards.

SUMMARY OF THE INVENTION

The object of the instant disclosure is to provide a direct-backlit keyboard characterized by being thinned and low-cost.

In order to achieve the aforementioned objects, according to an embodiment of the instant disclosure, a direct-backlit keyboard is provided, the direct-backlit keyboard comprising a plurality of keys, a thin film circuit board, a base plate, a copper etched thin-film circuit board, and a plurality of light-emitting units disposed on the copper etched thin-film circuit board. Each key is disposed on the thin film circuit board, the thin film circuit board being disposed on the base plate, the base plate being disposed on the copper etched thin-film circuit board. Each light-emitting unit corresponds to each key respectively in a manner such that light emitted from each light-emitting unit is transmitted to each corresponding key.

The instant disclosure uses copper etched thin-film circuit board as a substitute for PCBA and FPC that are used in prior art direct-backlit keyboards, reducing the thickness and the cost of direct-backlit keyboards. Moreover, each light-emitting unit corresponds to each key, and therefore each key is independently illuminated and can show an individual color. Furthermore, through a programmable design, the direct-backlit keyboard of the instant disclosure can flash or emit light regionally, or each key can flash or emit light individually.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
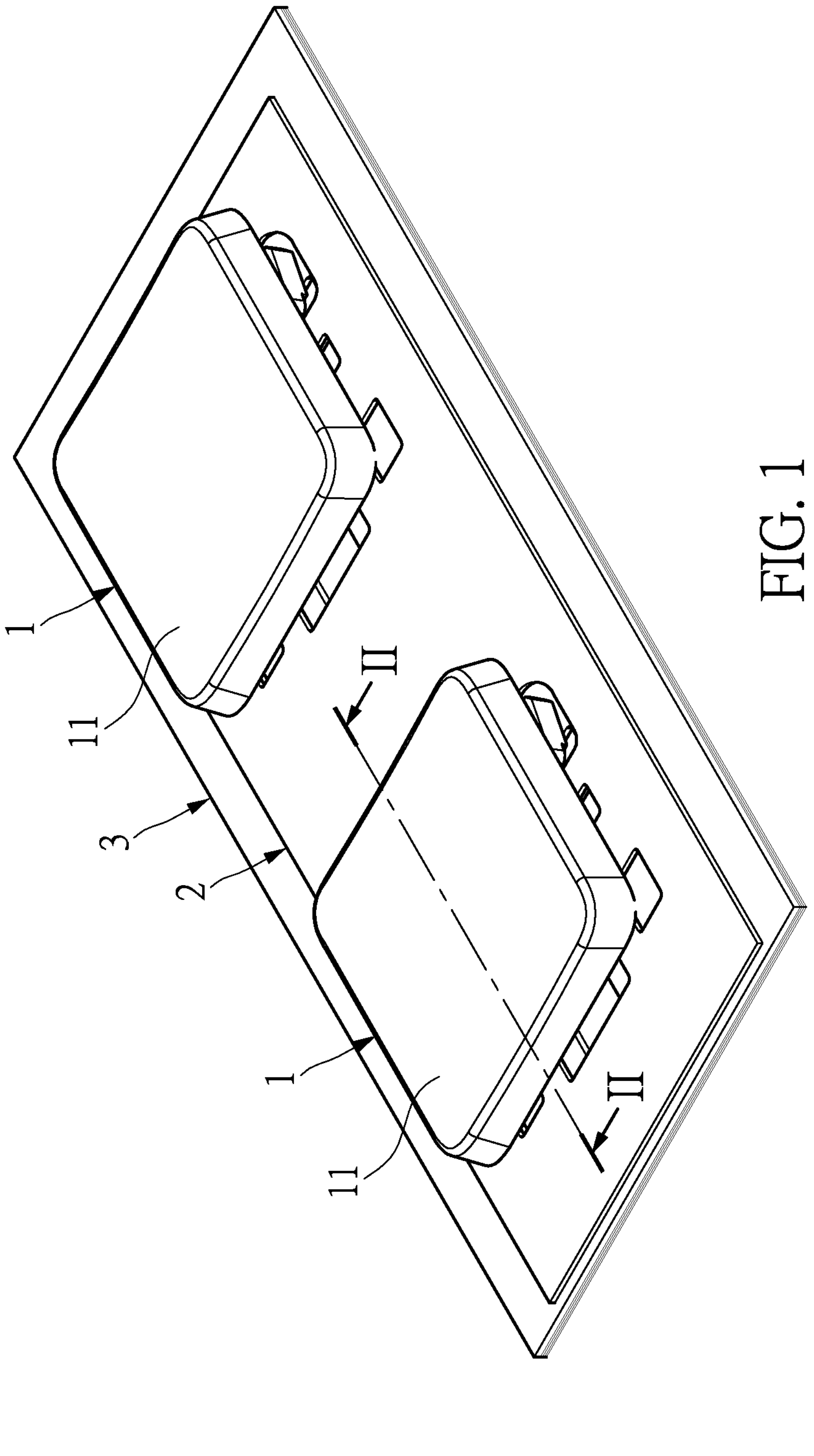
FIG. 1 is a schematic diagram illustrating a direct-backlit keyboard of the instant disclosure.
Figure 2:
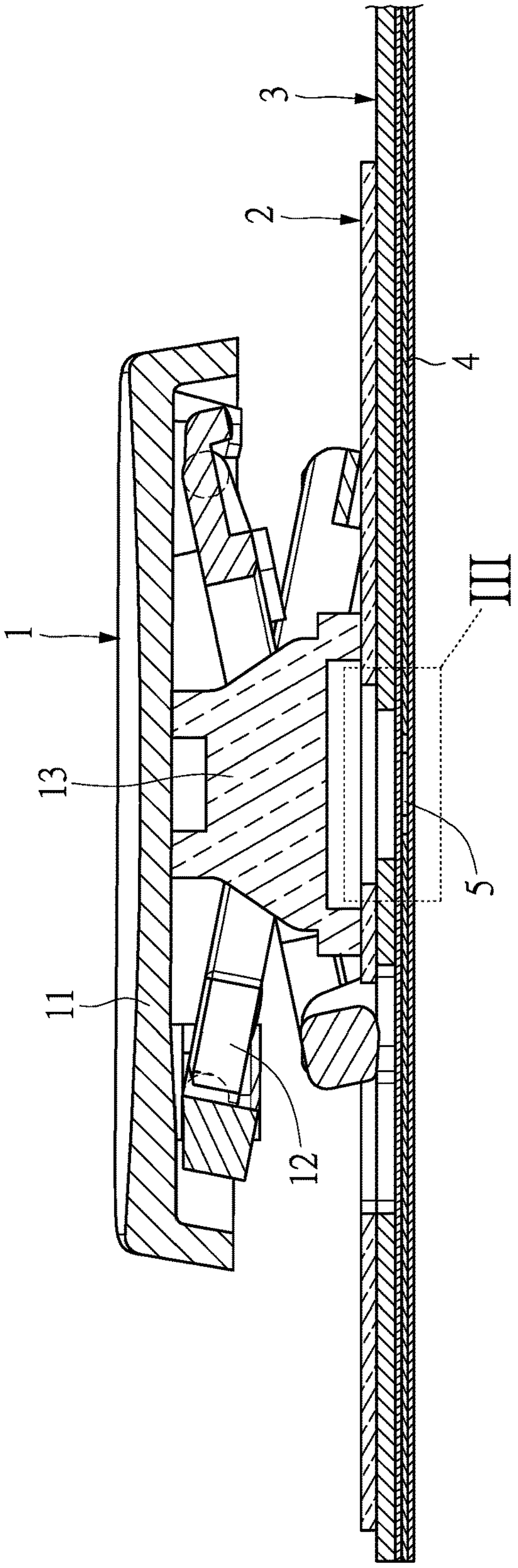
FIG. 2 shows a sectional view taken along line II-II of FIG. 1.
Figure 3:
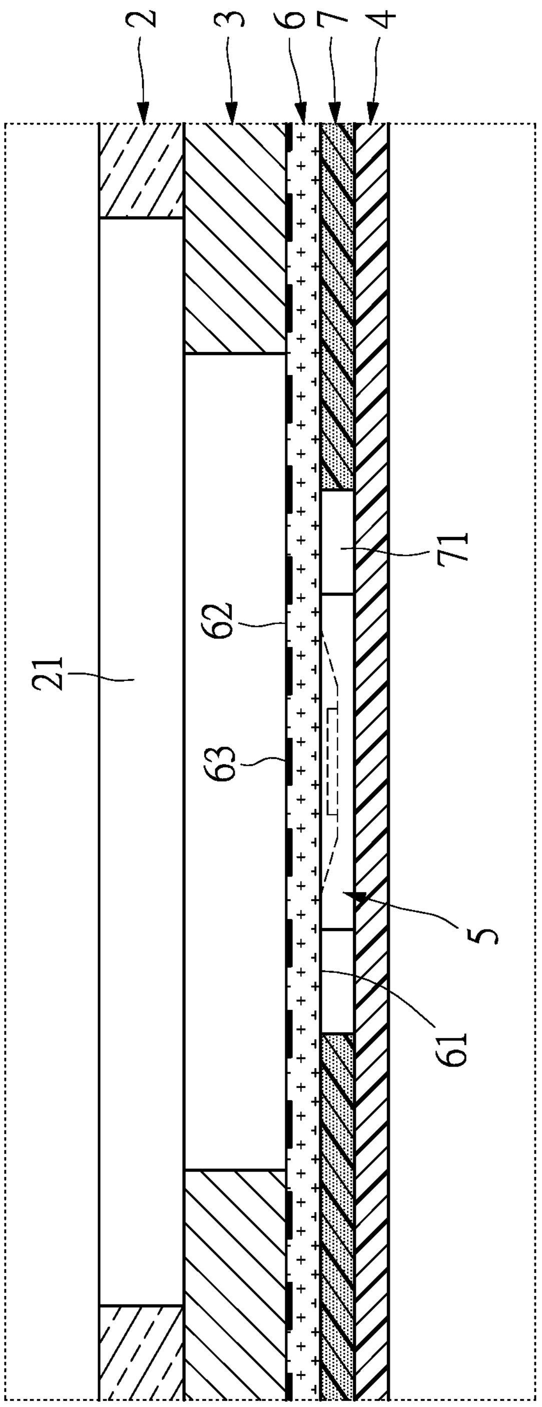
FIG. 3 is an enlarged view of area III shown in FIG. 2 according to a first embodiment of the instant disclosure.

Please refer to FIG. 1 to FIG. 3. According to one embodiment of the instant disclosure, a direct-backlit keyboard is provided. The direct-backlit keyboard of the present embodiment comprises a plurality of keys 1, a thin film circuit board 2, a base plate 3, a copper etched thin-film circuit board 4, and a plurality of light-emitting units 5 disposed on the copper etched thin-film circuit board 4.

Each key 1 is disposed on the thin film circuit board 2, the thin film circuit board 2 being disposed on the base plate 3, the base plate 3 being disposed on the copper etched thin-film circuit board 4. It should be noted that, to simplify the drawings, FIG. 2 shows only the sectional view of the left half portion of the direct-backlit keyboard of the instant disclosure, and the sectional view of the right half portion that is not included in the drawings is symmetric with the sectional view of the left half portion.

Each key 1 includes a keycap 11, a supporter component 12, and an elastic body 13. The supporter component 12 is disposed between the base plate 13 and the keycap 11 so as to support the keycap 11 and enable the keycap 11 to move vertically relative to the base plate 3 while keeping the keycap 11 balanced. The elastic body 13 is disposed between the keycap 11 and the thin film circuit board 2, generating a driving signal by pressing the thin film circuit board 2. Specifically, the keycap 11 is a transparent key sprayed with paint and laser-engraved. The keycap 11 can be fully light-permeable or partly light-permeable. The elastic body 13 can be a soft-light light bulb or a diffusion light bulb so that the light emitted from the elastic body 13 is scattered under Tyndall effect, whereby the laser-engraved characters on the keycap 11 are shown in even and bright light. The supporter component 12 can be a scissor-mechanism, and the elastic body 13 can be a rubber dome. However, the instant disclosure is not limited to this. A person skilled in the art can design the key 1 freely. The instant disclosure is not limited by the style or type of the key 1.

The thin film circuit board 2 can be a three-layered conductive film (not shown in the drawings.) The circuit on the thin film circuit board 2 can be formed by performing a silver-paste printing process on the upper layer and the bottom layer respectively so that an upper circuit and a bottom circuit are formed. The middle layer acts as a separation layer. When the thin film circuit board 2 is being pressed, the contact points of the upper circuit and that of the lower circuit can be in contact with each other and electrically connected. The thin film circuit board 2 can also be a flexible circuit board with circuits printed in silver paste, wherein the flexible circuit board has a light-permeable portion 21 corresponding to the through holes on the base plate 3. The light-permeable portion 21 can be formed by making holes through the thin film circuit board 2, or replacing parts of the thin film circuit board 2 with semi-transparent materials. The instant disclosure is not limited by the number of the light-permeable portions 21 and the positions and sizes of each of the light-permeable portions 21, which are open to be designed as required.

The copper etched thin-film circuit board 4 is a thin film circuit board made by etching a copper-plated thin film. The copper etched thin-film circuit board 4 is characterized by having high wiring density and being slim. A plurality of light-emitting units 5 are disposed on the copper etched thin-film circuit board 4. It is noted that, to make the drawings concise, there is only one light-emitting unit 5 shown in the drawings. The light-emitting units 5 are preferably LEDs. Each light-emitting unit 5 corresponds to each key 1 in a manner such that the light emitted from each light-emitting unit 5 can be transmitted to each key 1. This way, the PCBAs and FPCs that are used in the prior art direct-backlit keyboards are replaced by the copper etched thin-film circuit board 4 of the instant disclosure, and the thickness and high cost caused by PCBAs and FPCs can thus be reduced. Furthermore, since each light-emitting unit 5 corresponds to each key 1, each key 1 can emit light independently, and can show an individual color. Moreover, through the disposition of a microprocessor, the keyboard lighting is programmable so that the direct-backlit keyboard of the instant disclosure can flash or emit light regionally, or each key can flash or emit light individually.

The direct-backlit keyboard of the present embodiment further includes a light-diffusing sheet 6 so as to diffuse light. As shown in FIG. 3, the light-diffusing sheet 6 is disposed on top of the plurality of light-emitting units 5, and the light-diffusing sheet 6 includes a light incident surface 61 at one side thereof and a light exit surface 62 at the opposite side, the light incident surface 61 being attached to the plurality of the light-emitting units 5. Furthermore, the light-diffusing sheet 6 includes a diffusing structure 63 disposed on the light incident surface 61 or the light exit surface 62. Specifically, the diffusing structure 63 includes a plurality of light-shielding sub-structures so as to minimize uneven light distribution caused by the difference in the distances traveled by light emitted from the light-emitting unit 5. The diffusing structure 63 can be dark or white ink printed in a predetermined pattern onto at least one of the light incident surface 61 and the light exit surface 62.

Furthermore, the direct-backlit keyboard of the present embodiment further includes a reflector sheet 7 for reflecting the light transmitted to the bottom surface of the keycap 11 of the key 1 so that the light can be reused and the illuminance of the direct-backlit keyboard can be increased. As shown in FIG. 3, the reflector sheet 7 is disposed beneath the light-diffusing sheet 6 and above the copper etched thin-film circuit board 4. The reflector sheet 7 further includes a plurality of through holes 71 (only one through hole 71 is shown in the figure) that accommodate each light-emitting unit 5 respectively so that the light can pass through the reflector sheet 7. Specifically, the reflector sheet 7 of the present embodiment is a whitened monolayer reflector made of white resin, while in the prior art, the reflector is made of Mylar film with a black top surface and a white bottom surface. Accordingly, the reflector sheet 7 of the present embodiment has a higher reflectivity than that of prior art reflectors.

Figure 4:
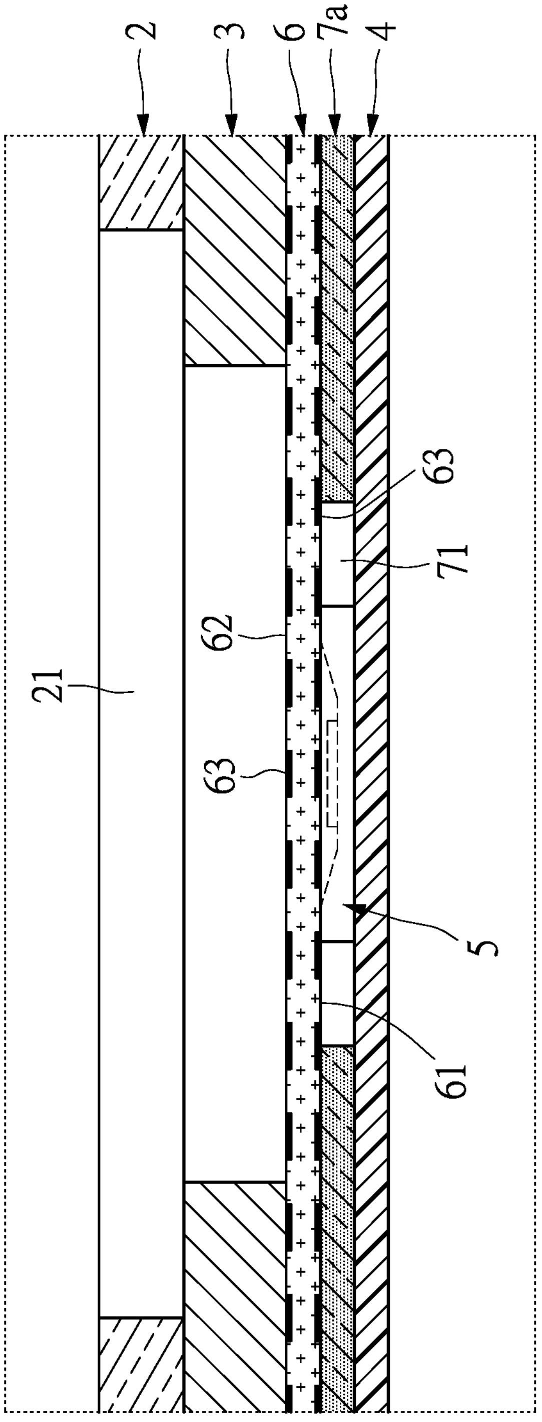
FIG. 4 is an enlarged view of a direct-backlit keyboard according a second embodiment of the instant disclosure.

FIG. 4 is a schematic diagram of the direct-backlit keyboard according to the second embodiment of the instant disclosure. The identical components of the present embodiment and the previous embodiment have the same reference numbers and the same functionality, and therefore will not be further described herein. The difference between the present embodiment and the previous embodiment is that the direct-backlit keyboard of the present embodiment includes a circuit protection film **7*a* for protecting the circuit traces of the copper etched thin-film circuit board 4. As shown in the figure, the circuit protection film 7*a* is disposed on the copper etched thin-film circuit board 4. Furthermore, the circuit protection film 7*a*** can be a thickened protection film.

Figure 5:
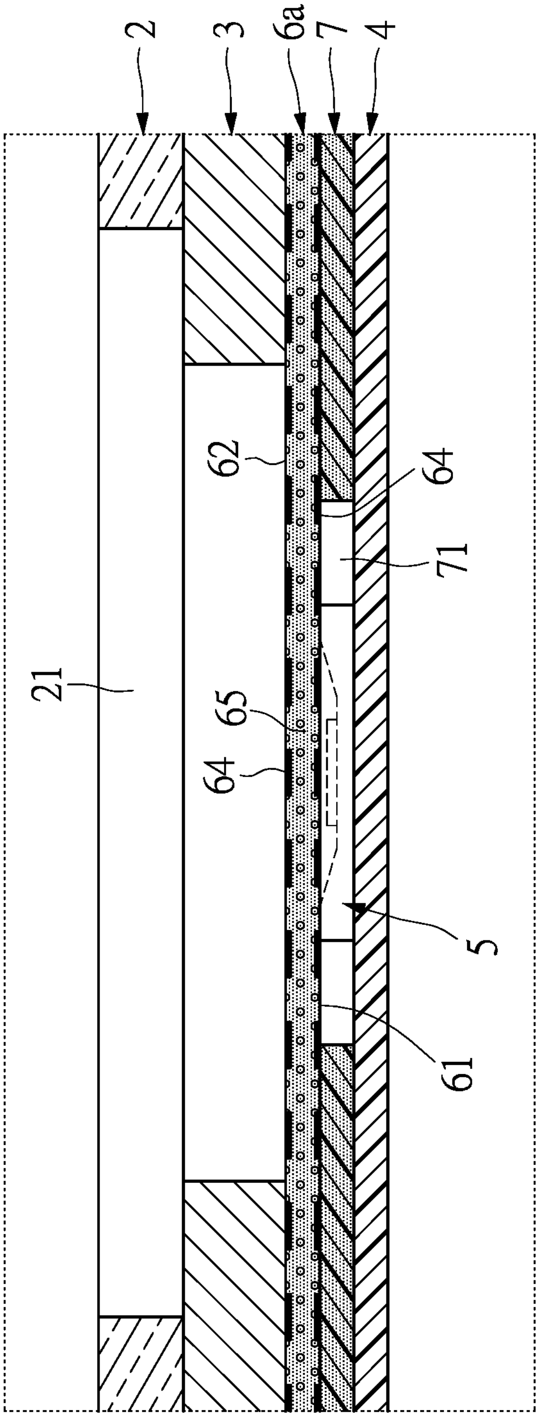
FIG. 5 is an enlarged view of a direct-backlit keyboard according to a third embodiment of the instant disclosure.

FIG. 5 illustrates the direct-backlit keyboard according to the third embodiment of the instant disclosure. The identical components of the present embodiment and the aforementioned embodiments have the same reference numbers and the same functionality, and therefore will not be further described herein. The difference between the present embodiment and the aforementioned embodiments is that the direct-backlit keyboard of the present embodiment includes a light-shielding layer **6*a*. As shown in the figure, the light-shielding layer 6*a* is disposed above the light-emitting unit 5 and the reflector sheet 7, and the light-shielding layer 6*a* includes an opaque area 64 and a light-permeable area 65, a part of the light emitted from the plurality of light-emitting units 5 being transmitted to the plurality of keys 1 through the light-permeable area 65, the other part of light emitted from the plurality of light-emitting units 5 being reflected back to the reflector sheet 7 by the opaque area 64. More specifically, the light-shielding layer 6*a* can be a thin film, and the opaque area 64 can be formed by printing ink onto at least one of the light incident surface 61 and the light exit surface 62 of the light-shielding layer 6*a* in a predetermined pattern so that the part of the light-shielding layer 6*a*** with printed ink can shield light.

Figure 6:
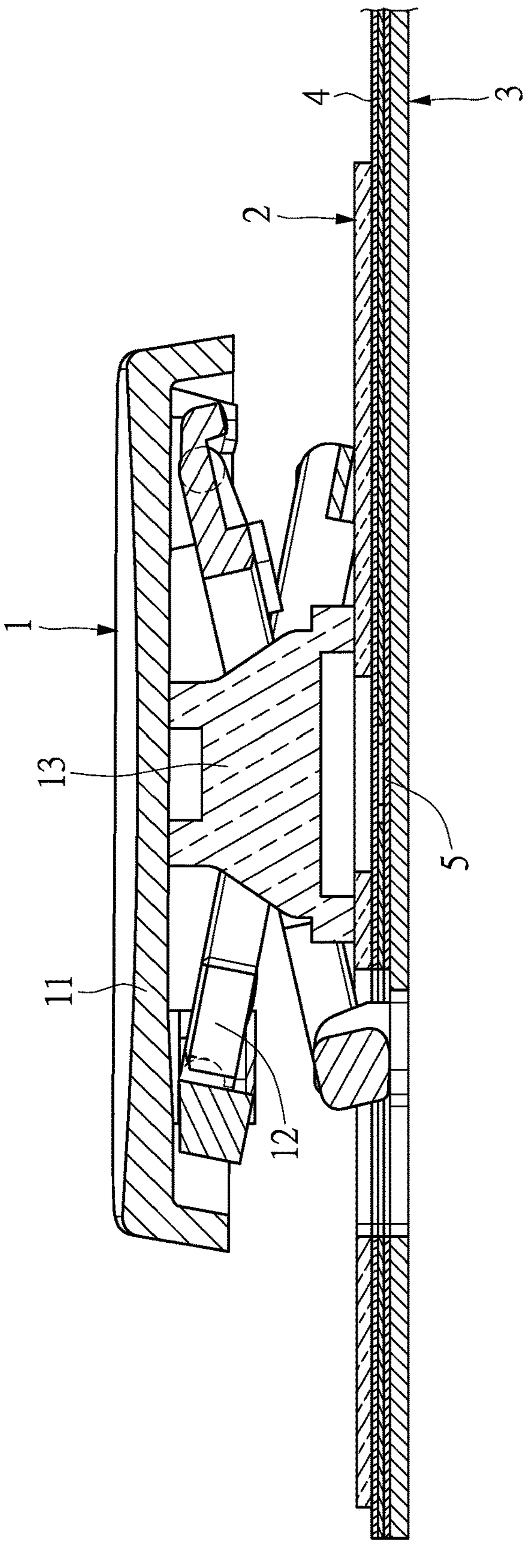
FIG. 6 shows a sectional view of a direct-backlit keyboard according to a fourth embodiment of the instant disclosure.

FIG. 6 illustrates a sectional view of the direct-backlit keyboard according to a fourth embodiment of the present disclosure. The identical components of the present embodiment and the previous embodiment have the same reference numbers and the same functionality, and therefore will not be further described herein. The difference between the present embodiment and the previous embodiment is that, in the present embodiment, the copper etched thin-film circuit board 4 is disposed on the base plate 3. Specifically, the copper etched thin film circuit board 4 is disposed between the thin film circuit board 2 and the base plate 3. The light emitted from the light-emitting unit 5 can be transmitted through the thin film circuit board 2 to the key 1.

In summary, the direct-backlit keyboard of the instant disclosure uses copper etched thin-film circuit board 4 to replace PCBAs and FPCs that are used in the prior art direct-backlit keyboards so as to reduce the thickness and cost of direct-backlit keyboards, thereby realizing low-cost and slim direct-backlit keyboards. Furthermore, since each light-emitting unit 5 corresponds to each key 1, each key 1 can emit light independently, and can show an individual color. Moreover, through the disposition of a microprocessor, the keyboard lighting is programmable so that the direct-backlit keyboard of the instant disclosure can flash or emit light regionally, or each key can flash or emit light individually.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A direct-backlit keyboard, comprising:

a plurality of keys;

a thin film circuit board;

a base plate;

a light-diffusing sheet;

a reflector sheet;

a copper etched thin-film circuit board; and a plurality of light-emitting units disposed under the copper etched thin-film circuit board, wherein each key is disposed on the thin film circuit board, the thin film circuit board being disposed on the copper etched thin film circuit board, the copper etched thin-film circuit board being disposed on the base plate;

wherein each light-emitting unit corresponds to each key respectively in a manner such that light emitted from each light-emitting unit is transmitted to each corresponding key; and wherein the light-diffusing sheet and the reflector sheet are disposed between the base plate and the copper etched thin-film circuit board, the reflector sheet being disposed on the base plate and under the light-diffusing sheet, the reflector sheet being a monolayer reflector sheet made of white organic resin.

2. A direct-backlit keyboard, comprising:

a plurality of keys;

a thin film circuit board;

a base plate;

a copper etched thin-film circuit board;

a plurality of light-emitting units disposed on the copper etched thin-film circuit board;

a light-shielding layer; and a reflector sheet;

wherein each key is disposed on the thin film circuit board, the thin film circuit board being disposed on the base plate, the base plate being disposed on the copper etched thin-film circuit board, and wherein each light-emitting unit corresponds to each key respectively in a manner such that light emitted from each light-emitting unit is transmitted to each corresponding key wherein the light-shielding layer being disposed on the reflector sheet and the plurality of the light-emitting units, the reflector sheet being disposed on the copper etched thin-film circuit board.

3. The direct-backlit keyboard according to claim 2, wherein the light-shielding layer includes a light-permeable area and an opaque area, a part of the light emitted from the plurality of light-emitting units being transmitted to the plurality of keys through the light-permeable area, the other part of light emitted from the plurality of light-emitting units being reflected back to the reflector sheet by the opaque area.

4. A direct-backlit keyboard, comprising:

a plurality of keys;

a thin film circuit board;

a base plate;

a light-diffusing sheet;

a reflector sheet;

a copper etched thin-film circuit board; and a plurality of light-emitting units disposed on the copper etched thin-film circuit board, wherein each key is disposed on the thin film circuit board, the thin film circuit board being disposed on the base plate, the base plate being disposed on the copper etched thin-film circuit board;

wherein each light-emitting unit corresponds to each key respectively in a manner such that light emitted from each light-emitting unit is transmitted to each corresponding key; and wherein the light-diffusing sheet and the reflector sheet are disposed between the base plate and the copper etched thin-film circuit board, the reflector sheet being disposed on the copper etched thin-film circuit board and under the light-diffusing sheet, the reflector sheet being a monolayer reflector sheet made of white organic resin.

5. The direct-backlit keyboard according to claim 4, wherein the copper etched thin-film circuit board is a thin film circuit board made by etching a copper-plated thin film.

6. The direct-backlit keyboard according to claim 4, further comprising a light-shielding layer, the light-shielding layer being disposed on the reflector sheet and the plurality of the light-emitting units.

7. The direct-backlit keyboard according to claim 6, wherein the light-shielding layer includes a light-permeable area and an opaque area, a part of the light emitted from the plurality of light-emitting units being transmitted to the plurality of keys through the light-permeable area, the other part of light emitted from the plurality of light-emitting units being reflected back to the reflector sheet by the opaque area.

8. The direct-backlit keyboard according to claim 4, wherein the light-diffusing sheet is disposed on the plurality of light-emitting units, the light-diffusing sheet including a light incident surface at one side thereof and a light exit surface at the opposite side, the light incident surface being attached to the plurality of the light-emitting units.

9. The direct-backlit keyboard according to claim 8, wherein the light-diffusing sheet includes a diffusing structure disposed on the light incident surface or the light exit surface.

10. The direct-backlit keyboard according to claim 9, wherein the diffusing structure includes a plurality of light-shielding sub-structures.

11. The direct-backlit keyboard according to claim 8, further comprising a circuit protection film disposed on the copper etched thin-film circuit board and under the light-diffusing sheet.

12. The direct-backlit keyboard according to claim 11, wherein the circuit protection film is a thickened protection film.

* * * * *